United States Patent
Kim

(10) Patent No.: US 7,483,343 B2
(45) Date of Patent: Jan. 27, 2009

(54) OPTICAL RECORDING APPARATUS AND A CONTROLLING METHOD THEREOF

(75) Inventor: Eun-mi Kim, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 814 days.

(21) Appl. No.: 10/962,517

(22) Filed: Oct. 13, 2004

(65) Prior Publication Data

US 2005/0281155 A1 Dec. 22, 2005

(30) Foreign Application Priority Data

Jun. 18, 2004 (KR) .................. 10-2004-0045296

(51) Int. Cl.
*G11B 21/08* (2006.01)

(52) U.S. Cl. .................. 369/30.36; 369/47.11

(58) Field of Classification Search .......... None
See application file for complete search history.

(56) References Cited

U.S. PATENT DOCUMENTS

| | | | | |
|---|---|---|---|---|
| 5,122,999 | A * | 6/1992 | Kimura et al. | 369/30.36 |
| 6,188,650 | B1 * | 2/2001 | Hamada et al. | 369/30.36 |
| 6,453,316 | B1 * | 9/2002 | Karibe et al. | 707/8 |
| 6,564,229 | B1 * | 5/2003 | Baweja et al. | 707/200 |
| 6,574,172 | B2 * | 6/2003 | Hamada et al. | 369/30.36 |
| 7,218,841 | B2 * | 5/2007 | Sato | 386/96 |
| 7,305,695 | B1 * | 12/2007 | Ramakesavan | 725/88 |
| 2002/0071351 | A1 * | 6/2002 | Hamada et al. | 369/30.24 |
| 2002/0150011 | A1 * | 10/2002 | Tsukihashi et al. | 369/47.33 |
| 2003/0223321 | A1 * | 12/2003 | Watanabe | 369/30.24 |
| 2004/0218899 | A1 * | 11/2004 | Oyama et al. | 386/46 |

FOREIGN PATENT DOCUMENTS

| | | |
|---|---|---|
| EP | 1085767 A2 | 3/2001 |
| EP | 1209683 A2 | 5/2002 |
| EP | 1296326 A1 | 3/2003 |
| EP | 1209683 A3 | 8/2003 |
| EP | 1085767 A3 | 2/2004 |
| KR | 1997-0017290 | 4/1997 |

OTHER PUBLICATIONS

European Search Report for corresponding European Patent Application No. 05252998.9 dated Apr. 23, 2007 (in English).
Korean Patent Abstract for Patent Registration No. 422699 filed May 22, 2001 (Abstract Only).

* cited by examiner

*Primary Examiner*—Tan X Dinh
*Assistant Examiner*—Van N Chow
(74) *Attorney, Agent, or Firm*—Staas & Halsey LLP

(57) ABSTRACT

An optical recording controlling method and an optical recording apparatus utilizing the method implement operations of performing a recording operation to record the data in the recording medium, applying a pause request signal to stop, temporarily, the recording operation, determining whether to set a record resume time, and if the record resume time is set while the recording operation is in pause, temporarily stopping the recording operation and then resuming the recording operation at the record resume preset time. Therefore, the recording operation may be resumed at a user's desired time.

9 Claims, 3 Drawing Sheets

OPTICAL RECORDING APPARATUS AND A CONTROLLING METHOD THEREOF

CROSS-REFERENCE TO RELATED APPLICATION

This application claims the priority of Korean Patent Application No. 2004-45296, filed on Jun. 18, 2004, in the Korean Intellectual Property Office, the disclosure of which is incorporated herein in its entirety by reference.

BACKGROUND OF THE INVENTION

1. Field of the Invention

The present invention relates in general to a controlling method of an optical recording apparatus, and more particularly, to an optical recording apparatus and a controlling method of an optical recording apparatus, in which although a data recording operation on an optical recording medium may be temporarily stopped or paused by a user, the recording operation is automatically resumed exactly at a recording resume preset time.

2. Description of the Related Art

An optical recording apparatus is a device for recording data on an optical disk using an optical disk driver. Typically, data is recorded on the optical disk in stream format, so that users are provided with images of the high quality and sounds.

FIG. 1 is a schematic view of a front panel of a general optical recording apparatus. Referring to FIG. 1, the optical recording apparatus comprises a front panel 100 provided with a key input unit 110 comprising a plurality of function keys 110a to 110g for a user to set desired functions or input an operation command therethrough. The front panel 100 further comprises a display 120 for displaying an operation currently under way in the optical recording apparatus, the state of the operation and a function selected by the user, and a tray 130 for loading and unloading the optical disk.

In general, the function keys on the key input unit 110 include a play key 110a to reproduce the data, a record key 110b to perform data recording, a stop key 110c to stop the process currently underway, a pause key 110d to stop, temporarily, the process currently underway, an open/close key 110e to open or close the tray 130, a rewind key 110f, and a fast forward key 110g.

The pause key 110d is used to apply a signal requesting temporary stop of data recording to the optical recording apparatus, such that a data recording operation currently underway is temporarily stopped. In contrast, the stop key 110c is used to stop the recording operation completely.

When the user operates the record key 110b on the front panel 100, a record request signal is applied to the optical recording apparatus, and as a result, data from external equipment is recorded on the optical disk. At this time, if the user needs to go somewhere for a while or the external equipment provides unwanted data, the user operates the pause key 110d to pause the data recording operation.

Once the data recording operation is paused by the operation of the pause key 110d, the optical recording apparatus is kept in pause state and does not resume the recording operation until the user applies a recording resume request signal to the optical recording apparatus by operating the record key 110b.

However, if the user does not return within time to resume the data recording operation and leaves the optical recording apparatus in pause state, or if the user forgets what he was doing and fails to resume the recording within a predetermined time, the user often loses data he wanted to record.

SUMMARY OF THE INVENTION

An aspect of the present invention is to solve at least the above problems and/or disadvantages and to provide at least the advantages described below. Accordingly, an aspect of the present invention is to provide an optical recording apparatus in which a user presets a recording resume time so that the data recording operation is automatically resumed at the recording resume time even after a temporary stop of the recording operation on the recording medium has been made by the user, and a controlling method thereof.

To achieve the above-described aspects of the present invention, a controlling method of an optical recording apparatus to record data in a recording medium, the method including performing a recording operation to record the data in the recording medium; applying a pause request signal to stop, temporarily, the recording operation; determining whether to set a record resume time; and if the record resume time is set while the recording operation is in pause, temporarily stopping the recording operation, and then resuming the recording operation at the record resume time.

If the user declines to set the record resume time, maintaining the pause state until a record request signal to resume the recording operation is applied.

In an exemplary embodiment, if a specific amount of time for the recording operation is allocated, the recording operation is performed for the allocated amount of time.

In an exemplary embodiment, the record resume time is set within a remaining time of the allocated amount of time.

Another aspect of the invention provides an optical recording apparatus to record data provided from an external equipment in a recording medium, the apparatus including: a pickup to record the data in the recording medium; a servo driver to drive the pickup; a key input unit to apply at least one request signal; and a controller to control the servo driver, wherein if a record resume time is input following the application of a pause request signal from the key input unit to pause the recording operation, the controller controls the servo driver to stop the pickup temporarily, and if the record resume time occurs, the controller controls the servo driver to drive the pickup.

The apparatus further includes a display to display designated information under the control of the controller, and if the pause request signal for temporarily stopping the recording operation is applied, the controller controls the display to show a message asking a user whether to set the record resume time.

In an exemplary embodiment, if the user declines to set the record resume time, the controller controls the servo driver to ensure that the pickup is maintained in a pause state until a record request signal is applied from the key input unit.

In an exemplary embodiment, the key input unit is a remote controller to send an infrared signal in correspondence with the request signal.

Additional aspects and/or advantages of the invention will be set forth in part in the description which follows and, in part, will be obvious from the description, or may be learned by practice of the invention.

BRIEF DESCRIPTION OF THE DRAWINGS

The above aspects and/or features of the present invention will be more apparent by describing certain embodiments of the present invention with reference to the accompanying drawings, in which.

DETAILED DESCRIPTION OF THE EMBODIMENTS

Figure 1:
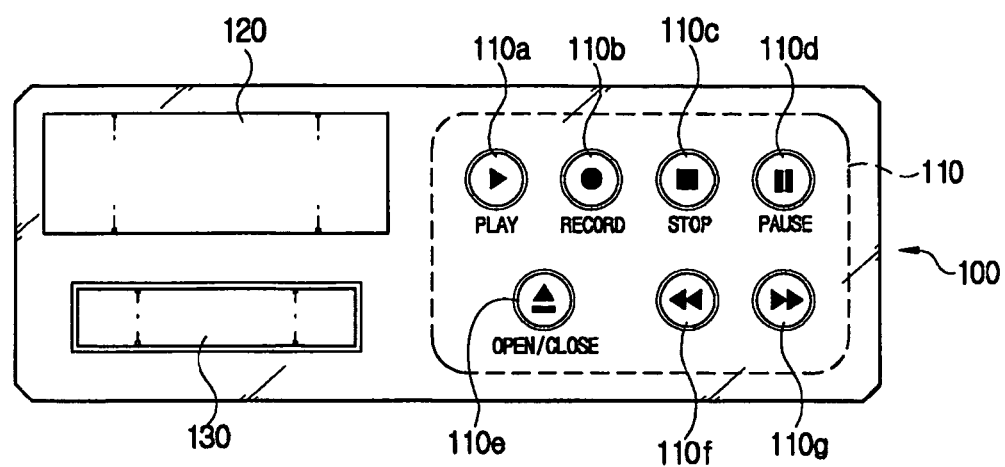
FIG. 1 is a schematic view of a front panel of a general optical recording apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

The matters defined in the description such as a detailed construction and elements are provided to assist in a comprehensive understanding of the invention. Thus, it is apparent that the present invention may be carried out without those defined matters. Also, well-known functions or constructions are not described in detail since they would obscure the invention in unnecessary detail.

Figure 2:
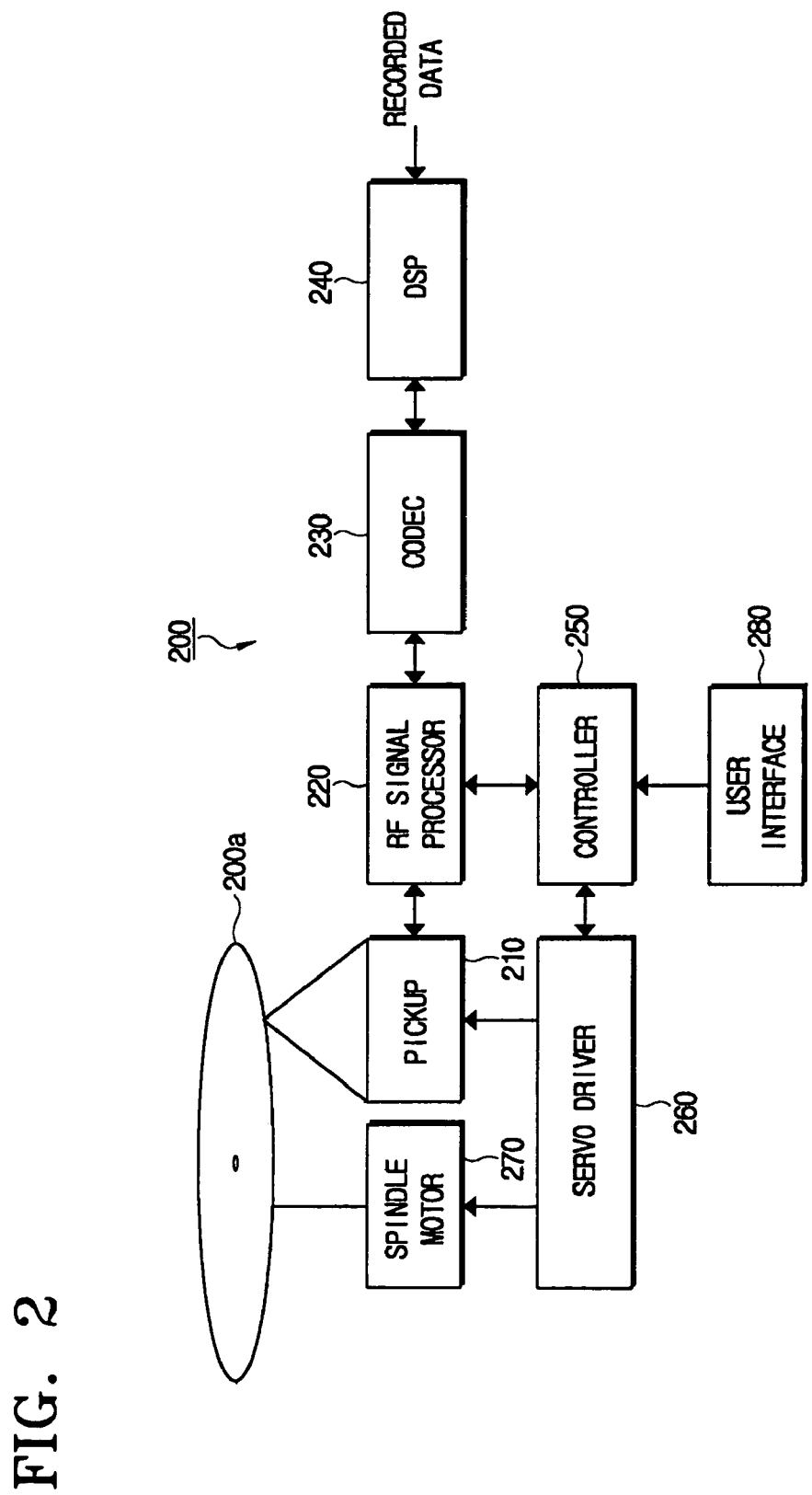
FIG. 2 is a block diagram of an optical recording apparatus according to an embodiment of the present invention.

FIG. 2 is a block diagram of an optical recording apparatus according to a preferred embodiment of the present invention. The optical recording apparatus 200 is a device to record data in a recording medium, being connectable to a variety of image sources like computers, broadcast receiving antennas, TVs, and hard disk drives. An example of the optical recording apparatus 200 is a DVD recorder. As for the recording medium, a one-time recordable medium such as CD±R and DVD±R, as well as a rewritable recording medium such as CD±RW, DVD±RW and DVD–RAM (rewritable), may be used. Additionally, while described as a recording apparatus 200, it is understood that the apparatus 200 may further reproduce data according to an aspect of the invention.

As illustrated in FIG. 2, the optical recording apparatus 200 of the invention includes a pickup 210, a radio frequency (RF) signal processor 220, a CODEC 230, a digital signal processor (DSP) 240, a controller 250, a servo driver 260, a spindle motor 270, and a user interface 280.

The DSP 240 converts data input to the optical recording apparatus 200 into digital data, and performs on the converted data a signal processing operation such as error correction to convert the data into a recording format. The CODEC 230 encodes the data converted into the recording format by the DSP 240, and decodes the encoded data. The spindle motor 270 rotates a loaded optical disk 200a. The pickup 210 records a signal in the optical disk 200a, or reads a recorded signal therefrom. The RF signal processor 220 filters and shapes the signal detected by the pickup 210 into a binary signal, and outputs it. The servo driver 250 controls the operations of the pickup 210 and the spindle motor 270.

The user interface 280 applies to the controller 250 a key operation signal applied by the user through the key input unit 110. As for the key input unit, the key input unit 110 of FIG. 1, which is formed on the front panel 100 of the optical recording apparatus 100, or a remote controller (not shown) sending an infrared signal in correspondence to each request signal may be used. However, it is understood that the input may be otherwise received, such as across network connections or the like.

There are certain types of key operation signals applied to the controller 250 through function keys shown in FIG. 1. For example, the play key 100a is assigned to output a play request signal, the stop key 110c a stop request signal, the pause key 110d a pause request signal, the OPEN/CLOSE key 110e a tray open/close request signal, the rewind key 110f a rewind request signal, and the fast forward key 110f a fast forward request signal.

If a record resume time is input after the pause request signal is applied from the key input unit 110 through the user interface 280, the controller 250 controls the servo driver 250 and stops the pickup 210 temporarily. As a result, the data recording operation currently underway stops temporarily.

When the record resume time is provided from the user interface 280 and the time is reached, the controller 250 controls the servo driver 250 to drive the pickup 210 again. In this manner, the temporarily stopped data recording operation is resumed.

If the pause request signal is applied, but the record resume time is not input from the user interface 280, the controller 250 controls the servo driver 260 and ensures that the pickup 210 is maintained in pause state until the record request signal is applied from the user interface 280.

Figure 3:
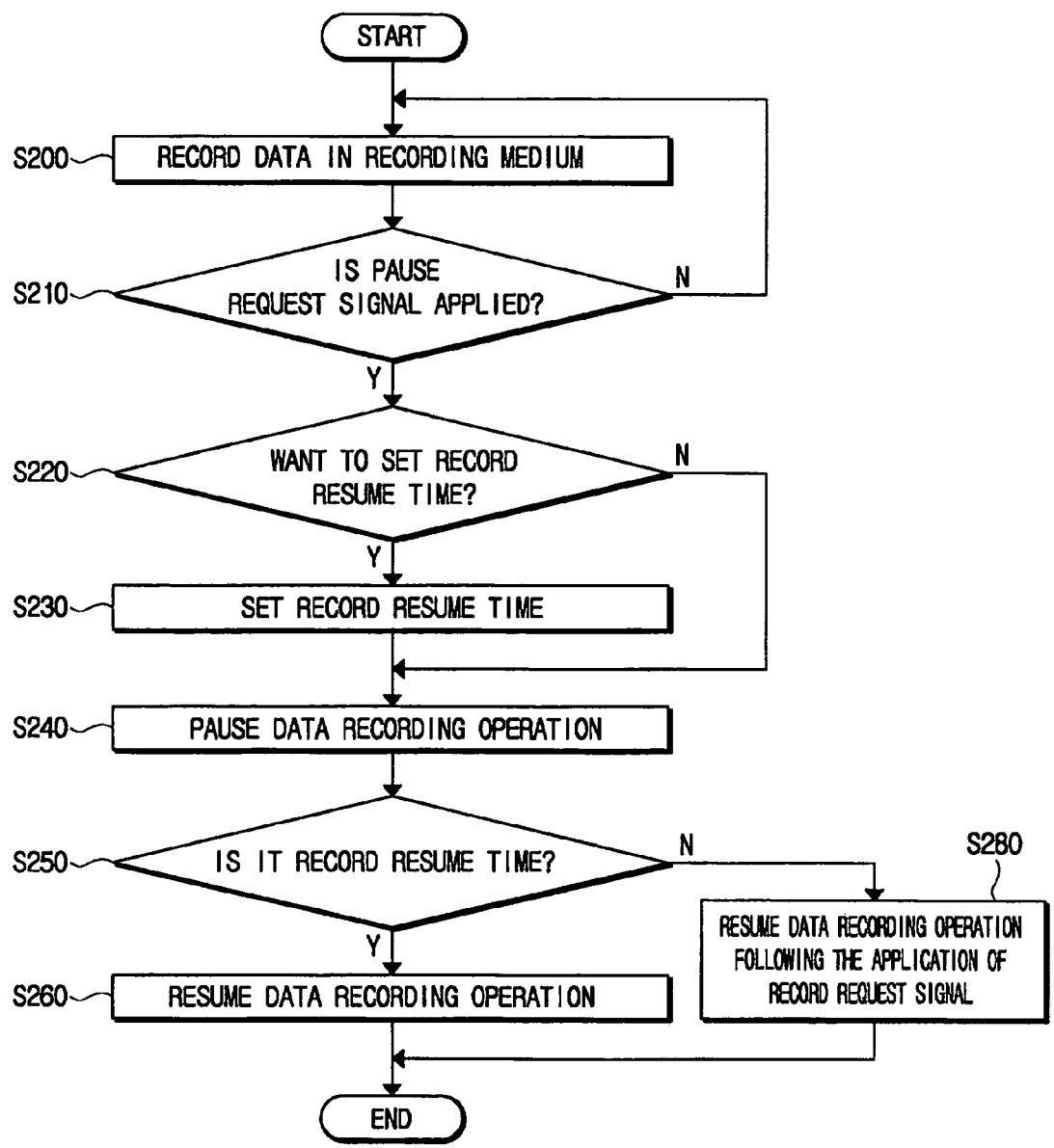
FIG. 3 is a flowchart illustrating a controlling method of an optical recording apparatus according to an embodiment of the present invention.

FIG. 3 is a flow chart illustrating a controlling method of an optical recording apparatus according to an embodiment of the present invention. Here, the controlling method of the optical recording apparatus will be explained with reference to FIGS. 1 to 3. While not required, it is understood that the method illustrated in FIG. 2 may be implemented as computer software encoded on a computer readable medium and implemented using a general or special purpose computer.

Using a generally known method, the user loads the optical disk 200a to the optical recording apparatus 200 connected to a designated image source, and operates the record key 110b. Then, the record request signal is transferred to the controller 250 from the user interface 280, and the controller 250 controls the servo driver 260 to drive the spindle motor 270. In this way, a recording data provided from the image source is recorded in the optical disk 200a (S200).

While the optical disk 200a is recording the data, if the user operates the pause key 110d, the pause request signal is applied from the user interface 280, and the controller 250 displays on the display 120 a message asking the user whether to set the record resume time (S210, S220).

If the record resume time is input from the user interface 280, the controller 250 controls the servo driver 260 to stop the spindle motor 270 (S230, S240) temporarily. The record resume time is recorded so as to allow the recording of the data to be resumed.

If the record resume time input from the user interface 280 has occurred while the data recording operation is being temporarily stopped, the controller 250 controls the servo driver 260 to ensure that the spindle motor 270 starts driving again, and the temporarily stopped recording operation may be resumed (S250, S260).

In operation 220, in the case that the user declines to set the record resume time, that is, if the user gives 'No' for an answer to the message provided to the display 120 by the controller 250, the message asking whether the user wants to set the record resume time, the controller 250 controls the servo driver 260 to stop the spindle motor 270 temporarily, thus temporarily stopping the data recording operation (S220, S240).

If the recording operation is temporarily stopped without the record resume time being preset, the controller 250 is maintained in pause state until the record request signal is applied from the user interface 280.

After operation 250 and if no record resume time is recorded, if the user operates the record key 110b, and therefore the record request signal is applied from the user interface 280, the controller 250 controls the servo driver 260 to drive the spindle motor 270, thus resuming the temporarily stopped recording operation (S280).

As may be appreciated from the above description of the an optical recording apparatus and the method to control the same, according to an embodiment of the present invention, when a user wants to stop temporarily during the recording process, the record resume time may be selectively set by the user to resume the recording correctly at a desired time.

While described as used with an optical recording apparatus, it is understood that the present invention may be used with magnetic and/or magneto-optical apparatuses.

While described as a record resume time, it is understood that other, non-time based events may be used to resume, automatically, recording of the data. Thus, accordingly to aspects of the invention, recording may be resumed if an eject button is pressed or if the power button is turned off to ensure that the recording is completed.

Accordingly, although the user may not return within time to resume the data recording operation after leaving the optical recording apparatus in a pause state, or the user forgets to resume the recording within the time to resume the data recording operation, loss of data for recording may be prevented.

The present invention may also be embodied as computer readable instructions on a computer readable recording medium. The computer readable recording medium is any data storage device that may store data which may be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code is stored and executed in a distributed fashion.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A controlling method of an optical recording apparatus to record data in a recording medium, the method comprising:

performing a recording operation to record the data in the recording medium;

determining whether a pause signal request has been applied;

if the pause request signal has not been applied, returning to performing a recording operation to record the data in the recording medium;

if the pause request signal has been applied, determining whether to set a record resume time; and if a user declines to set the record resume time, maintaining the pause state until a record request signal to resume the recording operation is applied;

if it is determined that the record resume time is to be set, setting the record resume time while the recording operation is paused, and temporarily stopping the recording operation until the record resume time occurs, and later resuming the recording operation at the record resume time;

determining whether the record resume time has been achieved, and if the record resume time has been achieved, resuming recording the data in the recording medium; and if the record resume time has not been achieved, resuming recording the data in the recording medium following application of a record request signal.

2. The controlling method according to claim 1, wherein if a specific amount of time for the recording operation is allocated, the recording operation is performed for the allocated amount of time.

3. The controlling method according to claim 2, wherein the record resume time is set within a remaining time of the allocated amount of time.

4. A computer readable medium having recorded thereon computer readable instructions to control a computer to resume, automatically, recording data on a data storage medium when recording is temporarily stopped or paused, the instructions comprising:

if a pause request signal is has been applied, determining whether to set a record resume time; and if a user declines to set the record resume time, maintaining the pause state until a record request signal to resume the recording operation is applied;

if it is determined that the record resume time is to be set, setting the record resume time while the recording operation is paused, and temporarily stepping the recording operation until the record resume time occurs, and later resuming the recording operation at the record resume time;

determining whether the record resume time has been achieved, and if the record resume time has been achieved, resuming recording the data in the recording medium; and if the record resume time has not been achieved, resuming recording the data in the recording medium following application of a record request signal.

5. The computer readable medium according to claim 4, further including determining if a specific amount of time for the recording operation is allocated, and if the specific amount of time for the recording operation is allocated, performing the recording operation during the allocated amount of time.

6. The computer readable medium according to claim 5, wherein the record resume time is set within a remaining time of the allocated amount of time.

7. A method of an optical recording apparatus to resume, automatically, recording data on a data storage medium when recording is temporarily stopped or paused, the method comprising:

determining, when a pause request signals stopping a recording operation temporarily, whether to set a record resume time;

if a user declines to set the record resume time, maintaining the pause state until a record request signal to resume the recording operation is applied;

if it is determined that the record resume time is to be set, setting the record resume time while the recording operation is paused, and temporarily stopping the recording operation until the record resume time occurs, and later resuming the recording operation at the record resume time;

determining whether the record resume time has been achieved, and if the record resume time has been achieved, resuming recording the data in the recording medium; and if the record resume time has not been achieved, resuming recording the data in the recording medium following application of a record request signal.

8. The method according to claim 7, further including determining if a specific amount of time for the recording operation is allocated, and if a specific amount of time for the recording operation is allocated, performing the recording operation during the allocated amount of time.

9. The method according to claim 7, further including determining whether the record resume time is set within a remaining time of the allocated amount of time, and if the record resume time is set within a remaining time of the allocated amount of time, resuming the recording operation.

* * * * *

UNITED STATES PATENT AND TRADEMARK OFFICE
CERTIFICATE OF CORRECTION

| | | |
|---|---|---|
| PATENT NO. | : 7,483,343 B2 | Page 1 of 1 |
| APPLICATION NO. | : 10/962517 | |
| DATED | : January 27, 2009 | |
| INVENTOR(S) | : Eun-mi Kim | |

It is certified that error appears in the above-identified patent and that said Letters Patent is hereby corrected as shown below:

Column 6, Line 16, after "signal" delete "is".

Column 6, Line 23, change "stepping" to --stopping--.

Signed and Sealed this

Twenty-fourth Day of March, 2009

JOHN DOLL
*Acting Director of the United States Patent and Trademark Office*